Oct. 11, 1932.  E. H. LORENZ  1,882,548

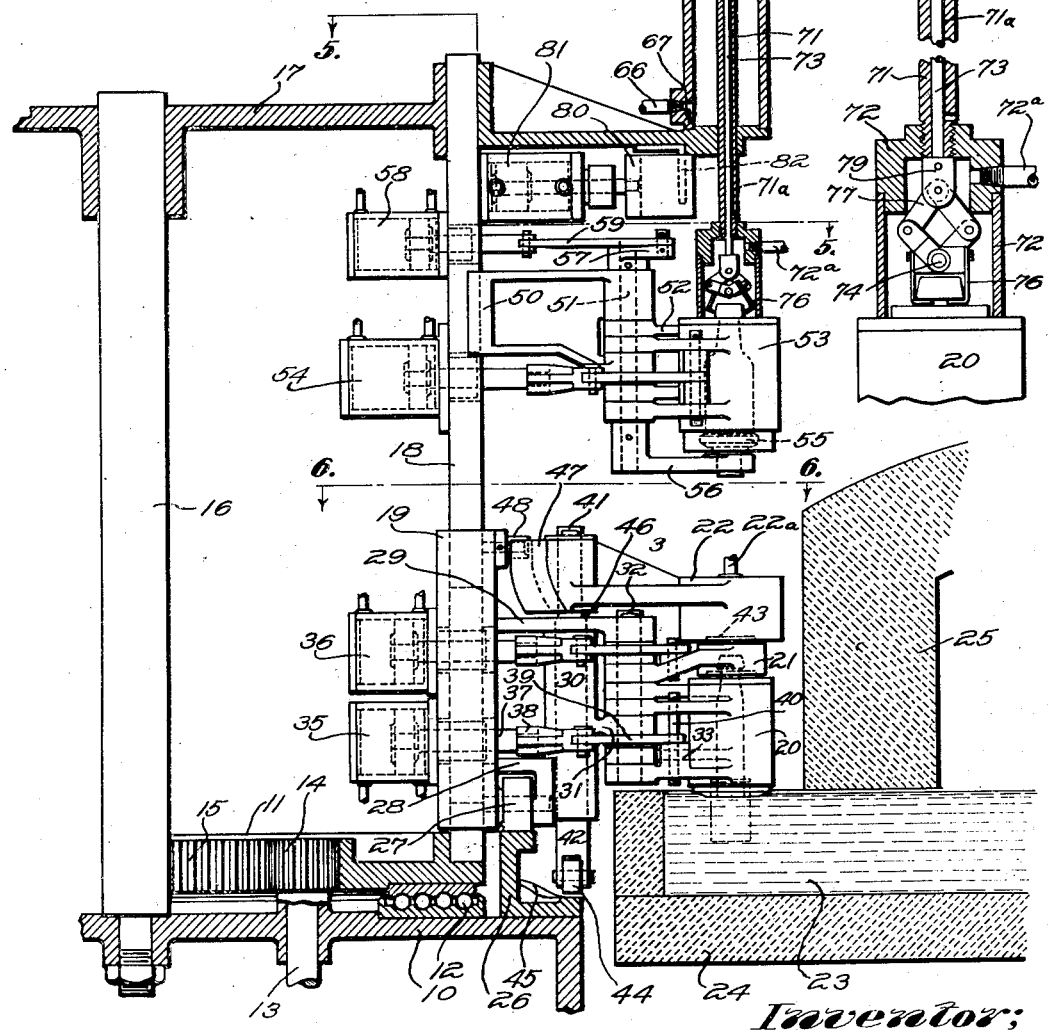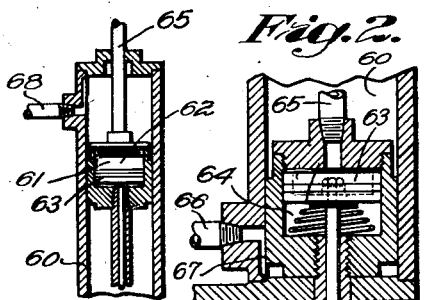

SUCTION GATHERING GLASSWARE FORMING MACHINE

Filed Jan. 24, 1930  2 Sheets-Sheet 2

Witness:
W. B. Thayer

Inventor:
Edward H. Lorenz
by Brown & Parkam
Attorneys

Patented Oct. 11, 1932

1,882,548

UNITED STATES PATENT OFFICE

EDWARD H. LORENZ, OF WEST HARTFORD, CONNECTICUT, ASSIGNOR TO HARTFORD-EMPIRE COMPANY, OF HARTFORD, CONNECTICUT, A CORPORATION OF DELAWARE

SUCTION GATHERING GLASSWARE FORMING MACHINE

Application filed January 24, 1930. Serial No. 423,043.

This invention relates to suction gathering glassware forming machines of the character in which a charge of glass for a parison is gathered by suction from the surface of a gathering pool in a parison forming unit, the charge being formed into a parison which subsequently is transferred to a finishing mold in which it is blown to final shape.

Various types of machines have been proposed for forming glassware by the suction gathering method, such as one-table, two-table, and reciprocating machines. This invention is particularly concerned with an improved one-table machine.

In the one-table machines heretofore contemplated, the parison forming units generally have been mounted above the blow mold, the transfer of a parison from the parison forming unit to the blow mold, or finishing mold usually being effected either by bodily moving the finishing mold into a position to close about a parison held suspended by the neck mold, or by lowering the neck mold and suspended parison into a position to permit the finishing mold to close about the parison. However, such arrangements are inconvenient because it is necessary to support the gathering pool some distance above the floor of the factory to permit the parison molds to dip into the glass. In many instances, it is difficult satisfactorily to arrange the melting tank and gathering pool and the machine at the required levels. Moreover, machines of the above character have been undesirably expensive to construct, because of the relatively complicated and heavy mechanisms required for effecting the transfer operation.

It is an object of the present invention to provide a novel machine in which the above and other objectionable features are avoided, and a machine of relatively simple construction and convenient arrangement is provided. To this end, the parison forming units are mounted below the finishing molds to permit them to dip into a gathering pool, the container for which may be located at a considerably lower level than generally is the case. Moreover, in apparatus embodying this invention, the parisons are transferred to the finishing mold without bodily moving the parison forming unit or the neck mold thereof, or the finishing mold, so that the construction of the machine is greatly simplified.

Another object of the invention is to provide a novel machine of the above character wherein each parison forming unit is mounted below the companion finishing mold, and the parison is transferred from the parison forming unit to the finishing mold by transfer tongs mechanism. The transfer tongs are lowered into a position to close about a parison in a parison forming unit, and then is operated to raise the parison upwardly into a position to be enclosed by the finishing mold. Inasmuch as the transfer tongs are of relatively light construction, the transfer of the parison may be effected more quickly and efficiently than is the case where the transfer is effected by moving one or the other of the molds of the machine, so that the machine as a whole may be operated more rapidly.

Other objects and advantages of the invention will be pointed out in the detailed description thereof which follows, or will become apparent from such description.

In order that the invention may more readily be understood, reference should be had to the accompanying drawings, in which one embodiment thereof is illustrated.

In said drawings:

Figure 1 is a view partly in vertical longitudinal section and partly in elevation of a portion of a machine embodying the invention and showing the machine in operative position adjacent a gathering pool;

Fig. 2 is an enlarged view in vertical longitudinal section of the tongs transfer mechanism shown in Fig. 1, and showing the tongs closed about a parison in the parison mold;

Figure 5:
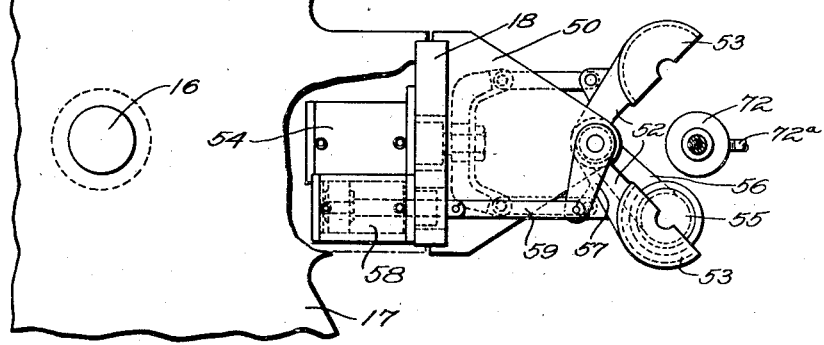
Fig. 5 is a view in horizontal sectional top plan, taken on the line 5—5 of Fig. 1.

In general, apparatus embodying the present invention may include a single rotary table which carries a plurality of parison forming units and a like number of finishing molds located above the respective parison forming units. Tongs transfer mechanisms are associated with each parison forming unit and the companion finishing molds for vertically transferring parisons upwardly from the parison forming units to the finishing molds. The several sets of parison forming units, finishing mold, and tongs transfer mechanisms are identical in construction and therefore only one set thereof is illustrated in the drawings and described hereinafter.

The mold table preferably is driven continuously, the rotation thereof serving to dip the parison mold into the glass of the gathering pool, as a result of the cooperation of a vertical dipping frame mounted on the table with a stationary cam. The parison forming unit includes a parison mold, a neck mold, and a suction head. After a dipping operation and the formation of the gathered charge into a parison, the neck mold is opened and the sucton head is swung out of alignment with the neck mold and parison mold. In the meantime, the transfer tongs will have been moved downwardly between the sections of the previously opened finishing mold, which is located above the parison forming unit and carried by the table, so that by the time that the suction head has swung aside, the tongs may freely move into a position to close about the neck of the parison in the parison mold.

After the tongs transfer mechanism has closed about a parison, the parison mold is opened, whereupon the parison is moved vertically upwardly between the sections of the finishing mold, which then is closed, and the tongs opened, to release the parison in said mold. A bottom plate associated with the finishing mold serves to close the bottom thereof, and the parison is blown to final shape through a blowhead structure, preferably carried by the tongs transfer mechanism. Upon completion of the final blowing operation, the tongs are elevated to a sufficient height to permit the finished article to be removed from the finishing mold.

Referring in detail to the drawings:

The base 10 of the machine carries a table 11 which rides on ball bearings 12 confined in suitable raceways formed on the bottom of the table and top of the base, as shown. The table 11 preferably is driven continuously through suitable mechanism, not shown, connected to a vertical shaft 13 journaled in the base 10, and carrying a pinion 14 which meshes with an internal ring gear 15 provided on the table 11.

The base 10 supports a central column 16 about which the table 11 rotates. A spider 17 also rotates about the column 16, which column extends through a central opening in said spider. The spider 17 is supported above the table 11 and connected to the table for rotation therewith by vertical guides, one of which is shown at 18.

Slidably mounted upon the guide 18 is a dipping frame 19. The dipping frame 19 carries a sectional parison mold 20, a sectional neck mold 21, and a suction head 22. Thus, the parison mold, neck mold and suction head are mounted for unitary rotation with the table 11, and for unitary dipping movements, so that by the lowering of the dipping frame 19 at the appropriate times, the lower end of the parison mold 20 may be dipped into the glass in a gathering pool 23. The gathering pool may be contained, for example, in a stationary extension 24 of a suitable melting tank 25.

The dipping frame 19 is lowered and raised at appropriate times to move the parison mold 20 into and out of the glass in the gathering pool, by means of a stationary cam 26 mounted on the base 10 of the machine. The cam 26 is engaged by a roller 27 mounted in a bracket 28 on the lower end of the frame 19. Thus, rotation of the table 11 causes the parison forming unit to be lowered and raised.

Formed on the frame 19 is an upper bracket 29 with which a downwardly extending sleeve 30 is integrally formed. The sleeve 30 is joined to the bracket 29 intermediate the ends thereof and extends downwardly to a point where it is joined integrally with the outer portion of the bracket 28. The sleeve 30 is provided for a purpose to be hereinafter explained.

Figure 6:
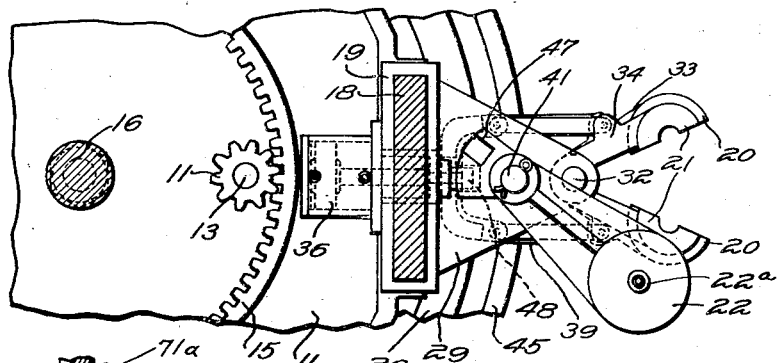
Fig. 6 is a view similar to Fig. 5, but taken on the line 6—6 of Fig. 1.

Formed on the sleeve 30 and extending outwardly therefrom is a lug 31 having an opening formed therein in alignment with a similar opening formed in the outer end of the bracket 29. Extending through the openings provided in the bracket 29 in the lug 31 is a hinge pin 32 held in vertical position by a cotter pin extending through the upper end thereof, as shown in Fig. 6. The hinge pin 32 carries the holders 33 for the sections of the parison mold 20, and the holders 34 for the sections of the neck mold 21, said holders being swingably mounted upon the hinge pin.

The parison mold 20 and the neck mold 21 are opened and closed at appropriate times by air motors 35 and 36. The mechanisms for connecting the air motors to the respective molds are identical in construction and therefore only one of such mechanisms need be described. The rod 37 of the air motor 35 extends radially outwardly through the frame 19 and is joined at its outer end to a cross head 38, the spaced arms of which are connected by links 39 to vertical pins 40 extending between arms of the holders 33, as shown.

Air pressure is admitted to and exhausted from the opposite ends of the air motor 35 alternately, to open or close the parison mold; the neck mold is opened and closed in like manner by air motor 36.

The suction head 22 is provided with a vacuum conduit 22a. Said head is loosely mounted upon the reduced upper end portion 41 of a vertical reciprocating rod 42, slidably but nonrotatably mounted in the sleeve 30, previously referred to. The suction head 22 is recessed on its under side as indicated at 43 to receive projections formed on the sections of the neck mold 21, thereby providing an air tight joint between the suction head and the neck mold.

In order to raise the suction head out of engagement with the said mold, and to swing it to one side out of the path of movement of the tongs transfer mechanism, the following means is provided: Mounted on the bottom end of rod 42 is a roller 44 adapted to engage a stationary cam 45 carried on the bed 10. The rod 42 is raised and lowered by the cam 45. When the rod 42 is raised, a shoulder 46 formed on the rod 42 engages the bottom of the suction head raising it out of engagement with the neck mold. Further elevation of the rod 42 serves to swing the suction head out of alignment with the neck mold by the cooperation of a cam 47 on the inner end of the suction head with a stationary pin 48 mounted on the upper end of the dipping frame 19. The shape of the cam 47 is such as to swing the suction head in a clockwise direction to the desired extent. After the parison has been removed from the parison mold, and the parison and neck molds have been closed, the rod 42 is lowered to swing the suction head back into alignment with the neck mold, and to permit it to be lowered into air tight engagement therewith.

Considering now the construction of the finishing mold, a two-arm bracket 50 is mounted on guide 18 near the upper end thereof, the outer ends of the arms of said bracket having aligned openings formed therein to receive a shaft 51. Swingably mounted upon the shaft 51 are the holders 52 for the sections of the finishing mold 53. The finishing mold is opened or closed by means of an air motor 54 similar to air motor 35 and connected by means of a cross head and link to pins extending between the arms of the holders, as shown. It will be observed that the finishing mold and the parison and neck molds permanently are supported in vertical alignment with each other.

The bottom ends of the sections of the finishing mold preferably are open to facilitate the transfer of a parison thereto, and in order to close the open end of the finishing mold when it is closed, a bottom plate 55 is provided. The bottom plate 55 is carried by an arm 56 secured to the bottom end of the shaft 51, and is supported between the sections of the finishing mold which have recesses formed therein to provide a dove-tail fit with the bottom plate when the mold is closed. The arm 56 is oscillated to move the bottom plate into and out of closed position by means of a crank arm 57 secured to the upper end of shaft 51. An air motor 58 is connected to crank arm 57 by means of a link 59. Thus, operation of the air motor in one direction will move the bottom plate into a position to be enclosed by the finishing mold, and operation thereof in the other direction will move the bottom plate to one side out of the path of movement of the tongs transfer mechanism.

We now come to consider the tongs transfer mechanism. Mounted upon the top of the spider 17 near the outer end thereof is a cylinder 60. The cylinder 60 contains a hollow piston 61 in which a piston chamber 62 is provided. Located in chamber 62 is a piston 63, yieldingly held up by spring 64. Connected to piston 61 is a tubular rod 65 which communicates with the chamber above the piston 63, and extends upwardly through the head of cylinder 60. The rod 65 may have a flexible conduit (not shown) connected thereto by which air is introduced through rod 65 into chamber 62 to force piston 63 downwardly at appropriate times, as later described.

Air pressure is admitted to or exhausted from the lower end of cylinder 60 through a conduit 66, terminating in a downwardly extending groove 67 formed in the wall of the cylinder as shown, (Figs. 1 and 2). Air pressure likewise is admitted to or exhausted from the space in the upper end of cylinder 60 through a conduit 68.

The piston 61 has a downwardly extending tubular rod 71 connected thereto, to the bottom end of which is connected a hollow blowhead 72. Blowing air is conducted into the blowhead through a conduit 72a. A rod 73 connected to piston 63 extends downwardly through the tubular rod 71 for operating a pair of tongs enclosed within the blowhead 72 as will presently be described. Formed in rod 71 is a leak passage 71a through which air, which may seep downwardly past piston 63, may flow from the bottom of chamber 62 to the atmosphere.

Figure 3:
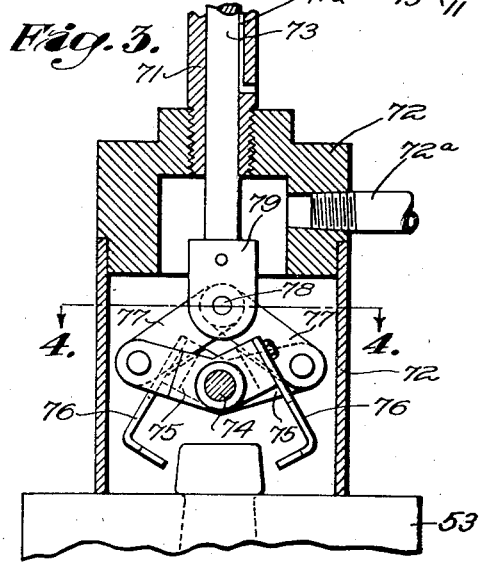
Fig. 3 is a still larger view in vertical longitudinal section of the bottom portion of the tongs transfer mechanism, showing the tongs in open position after having transferred a parison to the finishing mold.
Figure 4:
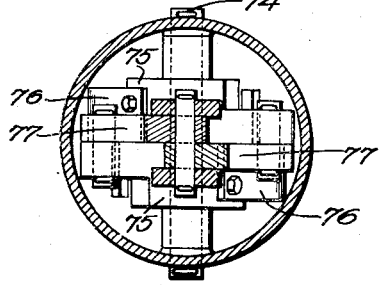
Fig. 4 is a view in cross section taken on the line 4—4 of Fig. 3.

Referring particularly to Figs. 3 and 4, it will be seen that a pivot pin 74 extends diametrically through the blowhead 72. Mounted upon the pin 74 is a pair of bent levers 75, each of which has a tongs member or gripper 76 secured to the shorter arm thereof. Pivotally connected to the longer arms of the levers 75 are links 77, the upper adjoining ends of which are mounted loosely upon a pivot pin 78 of a clevis 79 secured to the bottom end of the piston rod 73.

In order to prevent the tongs transfer mechanism from being raised too high with respect to the finishing mold upon the upward movement thereof, a stop member 80 is provided. The stop member 80 is U-shaped and is carried by the rod of an air motor 81 which serves to reciprocate the stop member into and out of position to embrace the rod 71 of the transfer mechanism. Outward movement of the stop member 80 is limited by stationary stop 82, as shown in Fig. 1. During the upward movement of the transfer mechanism in transferring a parison from the parison forming unit to the finishing mold, the stop member 80 will be projected outwardly embracing the rod 71 so that the top of the blowhead 72 will strike the stop member 80.

It will be understood that suitable time-controlled valve mechanism may be provided for operating the various air motors, and for supplying vacuum and blowing air at the desired times. Such mechanism forms no part of the invention and therefore is not shown.

The apparatus described above and illustrated in the drawings may be operated in any desired manner. One preferred mode of operation is as follows:

As the mold table 11 is rotated continuously, the parison forming unit is moved over the gathering pool, whereupon the dipping frame 19 is lowered by cam 26 to dip the end of the parison mold into contact with the surface of the glass in the gathering pool 23. As the table continues to rotate, suction is applied through the suction head 22 to the neck mold 21 and the parison mold 20 to fill the molds with glass. After the molds have been filled, the dipping frame 19 is raised, and the tail of glass connected to the charge is severed by suitable shearing mechanism, not shown. If desired, the suction head 22 may be adapted to supply preliminary blowing air to assist in shaping the charge into a parison.

Upon completion of the parison, rod 42 is elevated to swing the suction head out of alignment with the neck and parison molds, whereupon the neck mold is opened, leaving the neck portion of the parison exposed.

In the meantime, the finishing mold 53 will have been opened, the bottom plate swung aside, and the transfer mechanism will have begun its downward movement between the sections of the mold. At the time that the downward movement of the transfer mechanism is initiated, or shortly thereafter, air is admitted into chamber 62 through rod 65, the piston 63 thereby being moved into its lowermost position with respect to the piston 61, (Fig. 1) to open the tongs 76. The transfer mechanism is moved downwardly bodily by the exhaust of air pressure through conduit 66 and if necessary by the admission of pressure into conduit 68. When the transfer mechanism reaches its lower limit of travel, the bottom of the blowhead 72 will engage the top of the parison mold 20 as shown for example in Fig. 2. At this time, the air pressure above piston 63 in chamber 62 is exhausted through rod 65, as a result of which piston 63 is raised by spring 64 closing the tongs about the neck of the parison in the parison mold.

At the instant that the tongs are closed, the parison mold is quickly opened, releasing the parison in the tongs, which now are moved upwardly by the admission of air pressure through conduit 66 into cylinder 60 beneath piston 61, and by the exhaust of pressure through conduit 68.

After the top of the blowhead 72 has come into engagement with the stop member 80, which member previously is projected outwardly into operative position, the bottom plate is swung into position beneath the parison and the finishing mold is closed about the parison and the bottom plate. During the closing movement of the mold, the transfer mechanism is lowered slightly by the exhaust of air pressure through conduit 66, and the admission thereof through conduit 68, if necessary, until the bottom of the blowhead 72 strikes the top of the finishing mold, as shown for example in Fig. 3, and the transfer mechanism thereby is prevented from moving downwardly. Sufficient air pressure now is admitted through conduit 65 into chamber 62 quickly to move the piston 63 downwardly. The downward movement of piston 63 opens the tongs, releasing the parison in the finishing mold. As the parison is released, it may drop a slight distance until the neck finish portion thereof engages the top of the finishing mold. At this time, final blowing air is admitted through conduit 72a into the blowhead 72 and the parison is blown to final shape.

Upon completion of the blowing operation, the transfer mechanism is moved to the upper limit of its travel by the admission of air through conduit 66 and the exhaust thereof through conduit 68, stop member 80 previously being withdrawn into inoperative position, and the tongs being held open in the meantime by air pressure in chamber 62. This permits access to the finishing mold to remove the completed article. The air may be released from above piston 63 until the tongs mechanism again is moved downwardly, at which time, air will be applied to the piston to open the tongs. Or if desired, the air pressure may be maintained on piston 63 during the interval in which the mechanism is not in operation.

Finally the finishing mold is opened, leaving the finished article supported by the bottom plate, the article is removed, and the bottom plate swung out of the path of movement of the transfer mechanism.

Various changes in the details of construction and the mode of operation of the apparatus of the present invention may be made without departing from the scope of the appended claims. Although the invention has been described with respect to a continuous one-table glassware forming machine of the suction gathering type, it will be obvious that features thereof may be used to good advantage in other types of machines whether supplied with glass by suction, or otherwise, such as one or two table gob-fed machines, or two-table suction machines.

Having thus described my invention, what I desire to claim and to secure by Letters Patent is:

1. Apparatus for forming glassware comprising a parison mold, a neck mold, a movable suction head for engaging said neck mold, a finishing mold located above the suction head, parison mold and neck mold, means for vertically transferring a parison from the parison mold to the finishing mold, said suction head normally being in the path of movement of said transfer means, and means for moving the suction head out of the path of movement of the transfer means.

2. Apparatus for forming glassware comprising a parison mold, a neck mold mounted for cooperation with and above said parison mold, a finishing mold mounted above the parison and neck molds, means for permanently supporting said molds in vertical alignment with each other, and tongs transfer mechanism for transferring a parison in neck-up position from the parison mold to the finishing mold.

3. Apparatus for forming glassware comprising a parison mold, a neck mold associated with the parison mold, a finishing mold located above and in vertical alignment with the parison mold, a movable suction head interposed between said neck mold and finishing mold, tongs transfer mechanism for transferring a parison from the parison mold to the finishing mold, means for moving said transfer mechanism through the normal position of said suction head, and means for moving the suction head out of the path of movement of the tongs transfer mechanism.

4. Apparatus for forming glassware comprising a parison mold, a neck mold associated with the parison mold, a movable suction head engaging the neck mold, a finishing mold mounted above the parison mold, said suction head being interposed between the finishing mold and parison mold, tongs transfer mechanism for transferring a parison from the parison mold to the finishing mold, means for moving the suction head out of engagement with the neck mold and from its position between the finishing and parison molds, means for opening the neck mold to expose the upper end of the parison, means for lowering the transfer mechanism through the normal position of the suction head and into a position to close about the parison, means for closing the transfer mechanism about the parison, means for raising the transfer mechanism with the parison into a position to permit the parison to be enclosed by the finishing mold, means for closing the finishing mold about the parison, and means for opening the transfer mechanism releasing the parison in the finishing mold.

5. Apparatus for forming glassware comprising a parison mold and associated neck mold, a finishing mold mounted above the parison mold, tongs transfer mechanism for transferring the parison in neck-up position from the parison mold to the finishing mold, means for moving the tongs transfer mechanism downwardly into a position to close about a parison in the parison mold, means for so closing the tongs transfer mechanism, means for opening the parison mold to release the parison in the tongs transfer mechanism, means for moving the tongs transfer mechanism into an intermediate position to permit the finishing mold to close about the parison, means for so closing the finishing mold, and means for opening the tongs transfer mechanism to release the parison and for moving the tongs transfer mechanism into an upper non-obstructing position so that the removal of a finished article from the finishing mold may be effected.

6. Apparatus for forming glassware comprising a parison mold, a neck mold associated with said parison mold, a suction head engaging the neck mold, a finishing mold located above the parison mold, a bottom plate associated with the finishing mold, tongs transfer mechanism for vertically transferring a parison from the parison mold to the finishing mold, means for moving said mechanism through the normal positions of said suction head and bottom plate, means for moving the suction head out of the path of travel of the tongs transfer mechanism, and means for moving the bottom plate out of engagement with the finishing mold and out of the path of travel of the tongs mechanism.

7. Apparatus for forming glassware comprising a mold table, a dipping frame mounted on the said table, a parison mold, a neck mold and a suction head carried by said dipping frame, means for actuating said dipping frame to move the parison mold into contact with the surface of a pool of glass to gather a charge of glass by suction, a finishing mold mounted above the parison and neck molds, tongs transfer mechanism for transferring a parison from the parison mold to the finishing mold, means for moving the suction head out of the path of travel of the tongs transfer mechanism, means for opening the neck mold leaving a portion of a parison exposed in the parison mold, and means for lowering the tongs transfer mechanism into a position to close about the top of the parison, to move the parison into a position to be enclosed by the finishing mold, and to release the parison in the finishing mold.

8. Apparatus for forming glassware comprising a mold table, means for continuously rotating said table, a dipping frame mounted on said table, a parison mold, a neck mold and a suction head carried by said dipping frame, means for actuating said dipping frame to move the parison mold into contact with the surface of a pool of molten glass to gather a charge by suction, a finishing mold carried by said table, means for permanently supporting said finishing mold in vertical alignment with the neck and parison molds, tongs transfer mechanism for transferring a parison from the parison mold to the finishing mold, means for moving the suction head out of the path of travel of the tongs transfer mechanism, means for opening the neck mold to leave the top of a parison in the parison mold exposed, and means for raising and lowering the tongs transfer mechanism and for opening and closing the tongs thereof whereby said transfer mechanism operates to transfer a parison from the parison mold to the finishing mold.

9. Apparatus for forming glassware comprising a mold table, means for continuously rotating said table, a parison forming unit mounted on said table, said unit including a parison mold, a neck mold and a movably mounted suction head, means for dipping said unit into contact with the surface of a pool of molten glass to gather a charge of glass by suction, a finishing mold carried by said table, said mold being mounted on said table in permanent alignment with the parison forming unit, a bottom plate associated with said finishing mold, tongs transfer mechanism mounted in vertical alignment with the finishing mold for transferring a parison from the parison forming unit to the finishing mold, said suction head and bottom plate normally being aligned with and in the path of movement of the transfer mechanism, means for moving the suction head out of engagement with the neck mold and out of the path of movement of the transfer mechanism, means for opening the neck mold to leave the top portion of the parison in the parison mold exposed, means for moving the bottom plate out of the path of movement of the tongs transfer mechanism, and means for lowering the tongs transfer mechanism into a position to close about the top of the parison in the parison mold, to move upwardly into a position to permit the finishing mold to close about the parison, and to release the parison in the finishing mold.

10. Apparatus for forming glassware comprising a parison mold, a neck mold permanently associated therewith, means for supplying glass for a parison to said molds, a finishing mold, tongs transfer mechanism for transferring a parison from the parison mold to the finishing mold, and a blowhead carried by said tongs transfer mechanism for applying blowing air to the parison in the finishing mold, the tongs of said mechanism being enclosed by said blowhead.

11. Glassware forming apparatus comprising a suction parison mold, a neck mold associated with and mounted above the parison mold, a movable suction head mounted above the neck mold for cooperation therewith, a finishing mold, means for transferring a parison from the parison mold to the finishing mold, means for moving the transfer means in a path extending through the normal position of the suction head, and means for moving the suction head out of the path of movement of the transfer means.

Signed at Hartford, Conn., this 23rd day of January, 1930.

EDWARD H. LORENZ.